Figure 1:
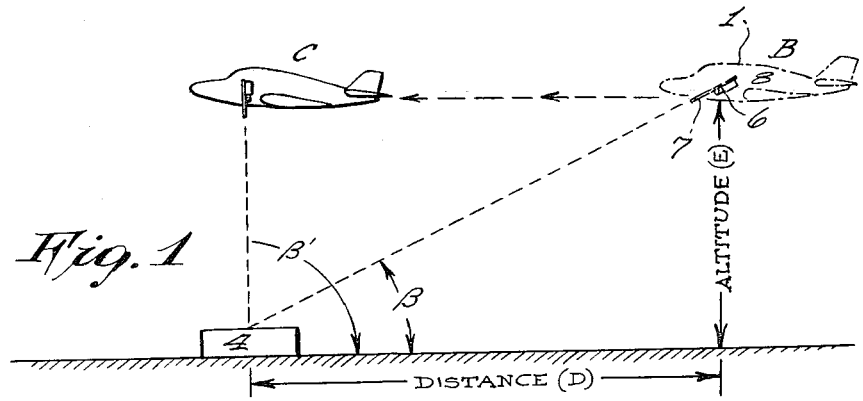

June 9, 1964     S. KALERGIOS     3,136,215
STRAFING DEVICE
Filed March 5, 1962

INVENTOR.
STEVEN KALERGIOS
BY
Jacob L. Kallin
ATTORNEY

United States Patent Office 3,136,215
Patented June 9, 1964

3,136,215
STRAFING DEVICE
Steven Kalergios, 91—07 Corona Ave., Elmhurst, N.Y.
Filed Mar. 5, 1962, Ser. No. 177,273
2 Claims. (Cl. 89—41)

This invention relates to the art of aerial gun control in general, and more particularly to means for and the method of continuously controlling the firing of a strafing gun mounted on an airplane flying on a predetermined, substantially level course, so that the gun will constantly remain accurately aimed at a stationary target.

Aiming devices employed in aircraft strafing which "dive" at a target are known. In many instances, however, this type of operation is not possible due to the nature of the terrain, as for example in the case where mountains enclose a narrow valley with the target situated in the latter, thus making such a target inaccessible to an aircraft flying transversely to the mountains.

Attempts have been made to overcome this disadvantage by employing complicated and expensive electronic mechanisms to enable an airplane to strafe ground targets while in level flight. These efforts have, however, not been practical due to the complexity and high cost of such devices.

It is therefore an important object of the invention to provide means and a method for continuously and automatically maintaining an aerial strafing gun on a fixed target while the aircraft on which the gun is mounted moves on a predetermined level course.

It is a further object of the invention to provide such means and method, which will enable the aerial strafing gun to maintain automatically an accurate aim on a fixed target regardless of the altitude of the aircraft on which it is mounted.

Another object of the invention is to provide means and a method for automatically and accurately maintaining the aim of an aerial strafing gun on a target regardless of the speed at which the aircraft is flying.

A further object of the invention is to provide inexpensive and simple means and method for the above purposes.

These and other important objects of the invention will become apparent from the following description and the accompanying drawing, illustrating a preferred embodiment of the invention.

It should be understood, however, that these are given by way of illustration and not of limitation, and that various changes in the details, form and arrangement of the parts may be made without departing from the scope of the invention.

Figure 2:
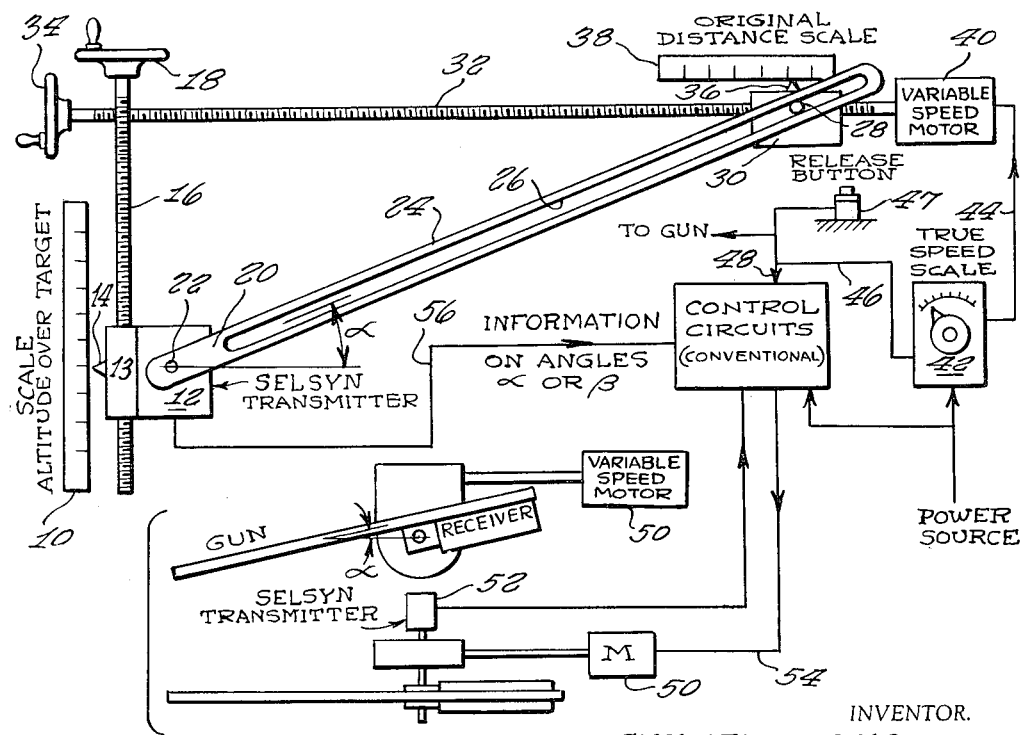

In the drawing:

FIG. 1 is a schematic representation of the means and method according to the invention, and FIG. 2 is a schematic representation of an embodiment of the device.

Referring now to the drawing in detail, there is shown in FIG. 1 a stationary target 4 which may be disposed on any type of terrain or waters. The strafing gun 6, provided with a gun barrel mounted forwardly of the plane 8 is initially aimed in known manner and commences firing at the target 4, while plane 8 is in the position B. In this position the angle of incidence of the gun's barrel relative to the target 4 at a predetermined altitude over the target, not mean sea level, is represented by the angle $\beta$. As the plane continues on its level course shown by the arrows the angle of incidence is progressively increased until it reaches an angular magnitude $\beta'$ when plane 8 has reached the position C. The altitude is indicated by E in FIG. 1.

Since the angle of incidence of the aircraft relative to the target continues to change as the former progresses in its flight, it is obvious that the gun barrel 7 must be in continuous proper alignment with the target during the aircraft's flight.

This continuous alignment is effected by employing the method and the device shown in FIG. 2. As will be readily seen in that figure, there is provided an altitude over target scale 10 adjacent a selsyn transmitter 12, to which is secured an indicating point 14, displaceable relative to the scale. The transmitter 12 is displaceable vertically, relative to the altitude scale by means of screw 16 which engages with a threaded collar 13 integral with the transmitter. The screw is provided with a handwheel 18, by means of which the transmitter may be adjusted vertically to correspond with a predetermined flight altitude over the target as indicated by pointer 14 on scale 10.

Pivotally secured with its one end 20, to the transmitter, at 22 is a rod 24, provided with a longitudinal slot 26 engaging with a pivot element 28 integral with a threaded collar 30 displaceable on a threaded screw 32. One end of screw 32 is provided with a handwheel 34, by means of which the threaded collar and its indicating pointer 36 may be displaced relative to the original distance scale 38 and set for the distance where firing is to begin. The other end of screw 32 is operably connected to a variable speed motor 40. Motor 40 serves to rotate screw 32 and thus progressively advance collar 30 in the direction of the arrow, in proportion to the advance of plane 8 from position B to position C'. The rate of speed of motor 40 is controlled by a speed control 42, through which power from a power source (not shown) is fed over line 44. Speed controls are known in the art and therefore require no detailed description. The particular control employed is provided with a true speed indicating scale. The true speed of the airplane is set on the speed control 42 because the latter must run at the same relative speed as the plane.

As shown in FIG. 2 the pointer 36 has been set at $D^1$, which, on the distance scale, corresponds to the distance D. in FIG 1, at which firing is to begin and pointer 13 has been set at $E^1$, which, on the scale, corresponds to the altitude E over the target. In this position the angle of tongue or rod 24 corresponds to the angle $\beta$ of FIG. 1.

With the plane in the position B and the device set as above, the gun 6 is aimed at the target 4 and firing is commenced by actuating the release button 47 to energize the circuits. Connection is established between the trigger control circuit device 46 through trigger signal line 48, the speed control 42, the gun trigger mechanism (not shown) as well as the variable speed motor 50 for displacing the gun at a progressively increasing angle as the aircraft progresses in its flight. The angular displacement of the gun is controlled through the feedback circuit consisting of selsyn transmitter 52, line 54 connected to the control circuit device.

The variable speed motor 50, responding to the action of the feedback and control circuits 46 corrects the gun position or angle $\beta$.

It will be seen, therefore, that as long as plane B maintains the altitude E over the target and the true speed as preset on speed control 42, the gun 6 will maintain a continuous proper alignment with the target during the aircraft's flight.

What I claim is:

1. A device for continuously controlling the firing of a strafing gun mounted on an airplane flying on a predetermined substantially level course to constantly maintain the gun aimed at a stationary target, comprising horizontally displaceable distance control means, means for presetting said horizontally displaceable distance control means for the initial distance from which the plane is to commence firing, vertical displaceable altitude control means, a rod pivotally connecting said horizontal and vertical means for presetting the altitude control means at which the airplane will fly, control circuit means actuable by said altitude control means for progressively controlling the angle of fire of the gun, said altitude control means being connected to said control means for supplying information to said control means, a variable speed motor operable by said control circuit means, said motor being operably connected to said horizontal distance control means, said rod being displaceable by said variable speed motor and said distance control means, said rod actuating said altitude control means, a variable speed gun displacing motor for displacing the gun, said gun displacing motor being controlled by said control circuit means, a feedback circuit connecting said gun displacing motor with said control means, a second selsyn motor, said second motor providing information to said control circuit means, switch means for electrically connecting the device to a source of power and firing button means for automatically actuating the whole system of the device.

2. A device or continuously controlling the firing of a strafing gun mounted on an airplane flying on a predetermined substantially level course to constantly maintain the gun aimed at a stationary target, comprising horizontally displaceable distance control means, means for presetting said horizontally displaceable distance control means for the initial distance from which the plane is to commence firing, vertical displaceable altitude control means, a rod pivotally connecting said horizontal and vertical means for presetting the altitude control means at which the airplane will fly, control circuit means actuable by said altitude control means for progressively controlling the angle of fire of the gun, said altitude control means being connected to said control means for supplying information to said control means, a variable speed motor operable by said control circuit means, said motor being operably connected to said horizontal distance control means, said rod displaceable by said variable speed motor and said distance control means, said rod actuating said altitude control means, a variable speed gun displacing motor for displacing the gun, said gun displacing motor being controlled by said control circuit means, a feedback circuit connecting said gun displacing motor with said control means, a true speed scale in the line between said control circuit and said variable speed motor, switch means for electrically connecting the device to a source of power and firing button means for automatically actuating the whole system of the device.

References Cited in the file of this patent
UNITED STATES PATENTS

| | | |
|---|---|---|
| 2,546,145 | Boonshoft | Mar. 27, 1951 |
| 2,576,331 | Close | Nov. 27, 1951 |

FOREIGN PATENTS

| | | |
|---|---|---|
| 332,885 | Germany | Feb. 12, 1921 |
| 574,117 | Great Britain | Dec. 20, 1945 |